2,985,011
Patented May 23, 1961

2,985,011

MICRO-TIMER

Loren C. Sackett, Inglewood, Calif., assignor to Brooks Walker, San Francisco, Calif.

Filed July 16, 1956, Ser. No. 598,081

17 Claims. (Cl. 73—116)

This invention relates to micro-timers for use in combination with engine analyzers, particularly such analyzers as are employed in connection with multi-cylinder engines of the radial type.

This application is a continuation-in-part of the copending application of the same inventor, Serial No. 494,453, filed 15 March 1955, entitled, "Engine Analyzer Indexing Means," which copending application is now abandoned.

Engine analyzers, as the term is here used, comprise sensing elements, associated with each cylinder, which respond to events occurring within such cylinder by an electrical indication, usually in the form of an electrical oscillation. Two broad types of sensing element are customarily used; one of these types is an electrical circuit coupled to the ignition system connecting to the particular cylinder under study, which responds to the electrical impulses that initiate the spark within that cylinder. The second broad type of sensing element is some form of vibration-responsive device, in its essence a microphone, which picks up characteristic vibrations set up at the opening and closing of the intake and exhaust valves of the cylinder or other events in its operation. Frequently, both types of elements are used, with switching means for selecting one or the other.

Whichever type of sensing element is employed, the indications from the sensing element are supplied to some type of curve-tracing device which displays a trace corresponding to variations of the electric waves generated by the sensing elements, with respect to a time base that is traced repeatedly in synchronism with the cycle of operation of the engine under study. In modern practice the curve-tracing device used is ordinarily a cathode-ray oscilloscope. The time base may either be circular, the cathode-ray beam being deflected to trace a circle near the periphery of the fluorescent screen of the cathode-ray tube or it may be rectilinear, the beam being swept across the face of the tube at a substantially constant rate, flying back to its initial position at a much more rapid rate at some predetermined point in the cycle of operation of the engine. The indications from the sensing elements may be displayed on a time base either as an intensification of the luminous spot produced by the impact of the cathode-ray beam on the screen, or by a deflection of the beam in a direction substantially normal to its deflection along the time base. Usually the deflection method of presenting the information from the sensing elements is preferred. Usually, also, the rectilinear form of time base is employed, because of simpler tube construction and circuitry.

The purpose of the display produced as described is to determine accurately the relative timing of events occurring, within each cylinder of the engine, with respect to a specific datum. Because it is fixed once for all in the mechanical construction of the engine itself, the datum chosen is usually the instant at which time the piston within the cylinder is at top dead-center. The great majority of engines now in use are the four-stroke-cycle type. Each piston, of course, occupies top dead-center position twice in each cycle of operation of the engine. For the purpose of explaining the present invention, the cycle of operation, with respect to each cylinder may be considered as beginning with the piston at top dead-center on the compression stroke, but it is to be understood that any other point in the operation of the cylinder could be taken as a datum or "time-zero" point of the stroke.

In aircraft engines of the radial type, to which the present invention is particularly applicable, these datum or time-zero points for the different cylinders are not displaced at exactly equal angles of rotation of the crank-shaft. This is because such engines employ one master connecting-rod, having a bearing at one end on a wrist-pin carried by the piston and one at the other end encircling the crank. The crank-shaft end of the master connecting rod carries a plurality of bearing pins and the other cylinders of the bank or row of cylinders carry connecting rods extending from the piston wrist-pins to a corresponding one of the bearing pins on the master connecting-rod. As a result of this construction the geometry of movement of each assembly of piston, connecting-rod and bearing-pin differs slightly from the others. Modern high-power aircraft engines have multiple banks of cylinders; typical engines of this character comprise four banks of seven cylinders each, with the cylinders associated with the master connecting-rod of each bank displaced angularly by increments of 90 degrees. The geometry of motion of corresponding pistons is therefore duplicated in successive banks, but the patterns of motion are displaced in successive banks, as described.

In engine analyzer practice, as employed in the past, the time-base of the sweep of the cathode-ray tube or other curve-tracing device has sometimes been derived from a source of alternating current synchronized with the cycle of operation of the engine under test. It is quite customary in engine practice to provide, for each engine, a polyphase generator, (usually three phase) geared for rotation at one-half of the engine speed. This generator drives a tachometer located in the cockpit of the plane. One phase of such a generator may be tapped to provide a single-phase electric wave and this wave may be used to synchronize a sawtooth wave generator, the output of which is employed to deflect (usually horizontally) the beam of the cathode-ray oscilloscope. If the apparatus is properly designed and adjusted, the starting point of the trace of the beam on the display screen will represent a constant epoch or phase in the cycle of operation of the engine as a whole. If the sawtooth wave generated by the sweep generator is strictly linear in character, and of known amplitude, the phase in engine operation at which an event indicated by a specific sensing element occurs can be obtained by measurement of the distance between the point of initiation of the trace and the perturbation of the trace resulting from the indication. Such indication can be measured by a ruler or a permanent scale can be imposed upon the face of the display tube.

This arrangement, and various modifications thereof, has numerous disadvantages, particularly in cases where it is desired to install an engine analyzer permanently on a plane, so that the performance of the engine can be constantly or periodically check in flight. The output amplitude of a sawtooth-wave sweep-generator usually varies with the frequency, and hence some form of amplitude adjustment, either an automatic compensator or a manual amplitude control must be provided if the linear measurement is to mean anything. It is frequently desirable to expand the trace of the oscilloscope, at least in the portion of the trace adjacent to the position of a particular event being studied. Such expansion will normally carry the beam deflection beyond the limits of the screen, so that it is impossible to determine whether or not the total deflection is of the desired amplitude or where it begins. It is difficult to maintain the waveform of a sawtooth amplifier output strictly linear, and curvature distorts the time or angular relationship being measured. A time-base providing a trace which always starts at the same point in the cycle of the engine as a whole may result in a flyback of the trace during the exact period when some event occurs which it is desirable to observe; this also requires that a correction be applied to each measurement to determine the datum point with respect to each cylinder in any one bank.

If the phase of the initiation of the trace is changed for the analysis of each cylinder, means must be provided to set the phase of the triggering wave accurately to correspond to the variation in angular increments between successive cylinders as measured, for example, from the chosen datum-point of the master cylinder. The phase of the generator which provides the time base must be accurately known; if, for any reason the polyphase generator is removed from the engine, the relative position of the engine drive-shaft, the coupling of the rotor of the generator to the drive-shaft, and the stator of the generator with relation to the engine must be known, so that resetting after such removal is an operation involving not only accuracy on the part of the servicemen employed but also considerable personal danger to them, for the generator is necessarily close to the rotating propellers driven by the engine or in a place that is difficult to get at. Furthermore, it customarily employs at least three persons, one to make the adjustment, one to observe the trace in the cockpit of the plane and a third to signal between the two others.

The case of the multi-cylinder radial engine is emphasized because it presents the greatest variety of difficulties, due to the number of variables that must be accounted for. Many of the same problems are involved in greater or less degree in the analysis of the operation of any mechanical device involving cyclic operation; i.e., rotating or reciprocating machinery whose motion is substantially harmonic and the epochs whereof can be expressed as a phase-angle measured from some selected datum.

The function of the micro-timer of the present invention is to avoid the various difficulties that have been touched upon above. In its broadest aspect it comprises means for developing a sharp pulse of electrical energy that can be applied to the curve tracing device at a known and directly measurable phase angle with respect to a selected datum in the cyclic operation under study—more specifically, in connection with the multi-cylinder engine, with respect to the selected "time zero" of any selected cylinder—and the epoch of occurrence whereof can be varied by known and directly readable amounts with respect to the datum selected. The pulse may be applied to vary the intensity of the trace, or to deflect the trace in the same manner as does the indication from a sensing element, the pulse in effect being added to the sensing element pulses. The pulse, as it appears on the trace, thus acts as a relatively movable cursor, the position of which, with respect, for example, to the angular displacement of the crankshaft from the datum point in any cylinder, can be read directly on a scale. The cursor can be set at the epoch of the cycle of operation of the particular cylinder at which the particular event, indicated by the associated sensing element, should occur. If the event does not occur at this precise epoch, the cursor may be moved to coincide with the leading edge of the indication of the event and the angular displacement of the event, with respect to the norm, can be read directly from the scale. This reading is unaffected by the lack of linearity in the sweep, the amplitude of the sweep or, to a large extent, the point of initiation of the sweep with respect to the operational cycle of the cylinder under examination. In addition, a pulse of opposite sign, developed at the opposite phase of the cycle, can be applied to synchronize the time base, thus bringing the cursor to the center of the trace and bringing the indication of the event to be studied into the most convenient position for observation.

In somewhat greater detail but still in broad terms, the present invention comprises a polyphase resolver; i.e., a device for deriving from a rotating field a single-phase electrical wave having a definite, adjustable relation to the phase, in space, of such field. Such resolvers are well known for various uses and may be of various types and the field may be either electric or magnetic. Thus one form of resolver comprises a polyphase winding, comparable to the winding of a delta connected, "ring" winding of a polyphase motor, with a relatively rotatable single-phase winding mounted within the field. Relative rotation of the field and the pick-up winding results in a change in electrical angle of the single-phase wave delivered by the pick-up with respect to the phase-angle of any selected phase of the polyphase input which may be used as a reference phase. Another type of resolver comprises a ring resistor or potentiometer, with the input phases connecting at equi-distant points around the ring and a pick-up comprising a pair of sliding contacts that engage diametrically opposite points on the ring. In this case the rotating field is an electric field directed diametrically across the ring. With either type there is no theoretical difference involved, whether it be the pick-up member or the member that establishes the field that is movable, but ordinarily it is more convenient to make the pick-up element the movable one. In either case the device is provided with a scale and index or indices. As in the case of the resolver itself, either of these elements may be the movable one, e.g., a fixed scale can be provided with a movable index to read the relative position of the resolver members, or a graduated dial may be rotatable with respect to a fixed index.

Means are provided for energizing the rotating field from a polyphase source, synchronized with the cycle of operation of the engine under test, for example, the three-phase tachometer generator of the engine. Considering the vector representing a selected phase of the polyphase supply as a reference, means are provided for shifting the position of the component of the resolver field corresponding to the reference vector, with respect to the zero reading of the scale index, by fixed increments, proportional to the angular separation of the crank-shaft positions between the datum points in the operation of successive cylinders of one bank in the engine to be tested. This, too, can be accomplished in various ways; thus it is possible to make both field and pick-up elements rotatable with respect to the mounting of the resolver as a whole, one of the elements being continuously rotatable and the other rotatable to fixed positions as determined by an index plate, the indexed positions being angularly separated as described. Another arrangement is to make the dial (or index) movable on the resolver shaft to definite, indexed positions. Preferably, however, from an operational standpoint, the field member of the resolver is provided with a plurality of sets of polyphase input leads, the leads of each set being spaced around the winding uniformly and successive sets connecting into the winding at points separated to correspond to the separation of the time-zero points of the various cylinders. With this latter arrangement switching means are provided for selectively connecting the various sets of polyphase input leads to the polyphase source. Switching means are provided, mechanically interconnected with the means for changing the zero reading of the scale with respect to the reference phase of the three-phase supply, for selecting the particular sensing element of the cylinder whose operation corresponds to the selected phase.

The single-phase wave derived by the pick-up element connects to pulse-forming means arranged to develop from the wave short pulses of electrical energy occurring at some definite phase of the input wave. Such pulse-forming equipment can assume various forms, well known in the electrical art. One of the most convenient comprises an overdriven amplifier that clips the tops of the amplified waves and thus converts the sine waveform into substantially rectangular pulses having relatively very short rise-times. These pulses are supplied to a differentiating network, such, for example, as a small series condenser supplying a resistor across which the output leads are connected. This arrangement yields a short pulse each time the rectangular wave input crosses zero, the pulses alternating in polarity. If desired, a rectifier may be added to the circuit so as to pass pulses of one polarity only, but this is not necessary, since alternate pulses are of opposite signs and are readily distinguishable.

Means are provided for applying the pulses thus developed to the cathode-ray display tube or other curve-tracing device of the analyzer. This can be done in either of two ways: the pulses can be applied to the control grid of the cathode-ray tube, either to intensify the beam and indicate the occurrence of the pulse as a bright spot on the trace or to blank the beam, giving a dark spot on the pulse, depending on the polarity with which the pulse is applied to the grid, or the pulse and the output of the sensing device on the cylinder under analysis can be supplied to a summing network that adds, algebraically, the instantaneous values of the two signals. If the latter system is used, it produces a sharp spike or "pip" as a perturbation of the time base, the position of this pip on the base being determined by the relative position of the elements of the resolver.

As an initial adjustment the relative phase of the polyphase source on the engine is set with respect to the scale-reading on the resolver so that the pip occurs when the piston of one selected cylinder is at top dead-center, or whatever other datum point may be chosen. This can be done by adjusting the relative position of armature and field of the generator with respect to the position of its drive from the crank-shaft. A simpler way is to make the scale or index of the resolver adjustable relative to the resolver shaft, so that zero can be set without disturbing anything mounted on the engine itself.

Normally, of course, the master cylinder will be chosen as the primary datum. The relative phases supplied to the rotating field element are built into the device, so that once the adjustment is made for any cylinder as a datum it will be correct for all cylinders of any engine of a particular design. In in-line engines the datum points will be separated by equal angles, the cylinders being in a single bank. In V type engines it may be convenient to consider the cylinders as either in a single bank or in two banks. It is convenient to add to the equipment thus described means for varying the epoch of the cycle of engine operation at which the sweep of the curve-drawing device is initiated. In the preferred embodiment of the invention this is accomplished by using the pulse generated at the opposite phase of the single-phase wave from that used to produce the cursor pulse to trigger the time-base generator. There can, however, be provided alternative means for varying the epoch at which the sweep starts.

From the above, the objects of the invention should be evident to those skilled in the art. These objects include the provision of means for determining accurately the timing of the critical events in the operation of each cylinder of an engine, particularly of an engine of the radial type; to provide means for making such determination directly from a scale, without the necessity of measuring the position on the trace of an indication with respect to some datum whose position may be more or less indeterminate; to provide means for reading the epoch of an indicated event with respect to each cylinder directly and without computation; to provide for measuring exactly the deviation of such an event from an indicated norm; to provide means which can be added to existing engine analyzers without difficulty and with relatively small expense; to provide means which can be permanently installed on an airplane to provide a check on the operation of all engines at any time and in the course of normal flight and in so doing detect any misfunction and forestall possible engine failure, and to provide means whereby the instant of initiation of the time-base sweep can be set at a selected epoch of the operation of any cylinder. Other objects and advantages of the invention will become apparent from a description of the preferred embodiment of the invention as illustrated in the accompanying drawings wherein:

Figure 1:
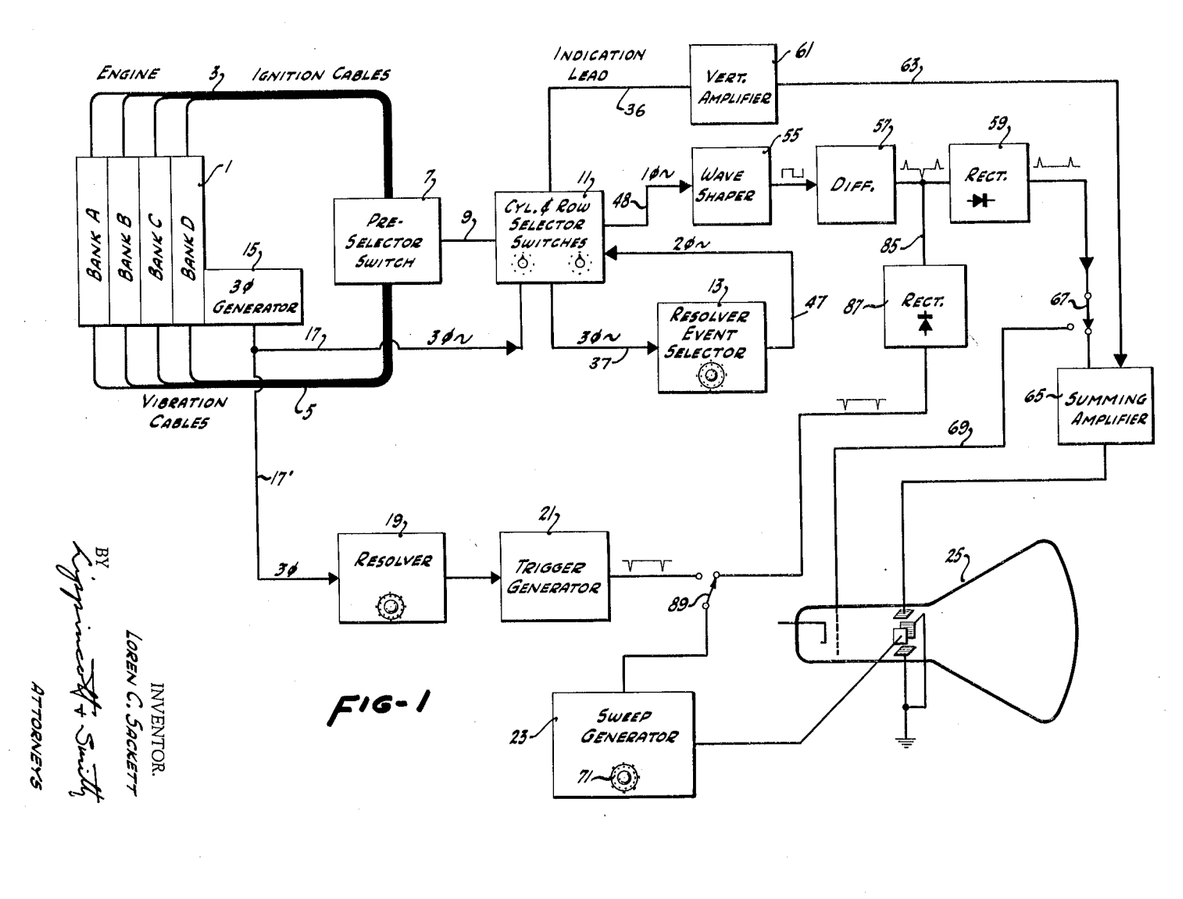
Fig. 1 is a block diagram of an engine, engine analyzer, and micro-timer installation in accordance with the present invention.

The diagram of Fig. 1 represents, in block form, a complete engine analyzer installation including the micro-timer of the present invention. The engine 1 is assumed to be a high-power aircraft engine of radial type, comprising four banks of cylinders of seven cylinders in each bank. The geometry of each bank of cylinders is identical as far as the combination of crank, connecting rods, and pistons are concerned, but the banks are mutually displaced so that, considered collectively, the master cylinders of the four banks are disposed about the axis of the crank-shaft at angles of zero, 90 degrees, 180 degrees and 270 degrees. There is associated with each cylinder of each bank two sensing elements: an ignition sensor and a vibration sensor, there thus being 28 sensing elements of each type. The connections of these sensing elements to the analyzers proper are made through an ignition cable 3 and a vibration cable 5. Each of these cables connects to a pre-selector switch 7, which consists of a group of ganged switch elements arranged to connect either all of the ignition sensing leads or, in its other position, all of the vibration sensing leads to a common, 28-lead cable 9, connecting to switches 11 of the micro-timer itself. Also connected to these switches is an event-selecting resolver, shown as a separate block 13, although in practice it is preferably combined in a single unit or cabinet with the switches 11.

Mounted on the engine 1, either permanently or for the purpose of tests, is a three-phase generator 15. In a four-stroke cycle engine, such as that assumed for purposes of illustration of the invention, the generator is geared to run at one-half the crank-shaft speed. In a device intended for use with a two-stroke cycle engine the generator would be run at crank-shaft speed, in either case, making one revolution for each revolution of the cam-shaft. The generator will thus develop one cycle per phase for each cycle of operation of the engine as a whole.

For convenience of description of the somewhat complex phase relationships involved in the operation of the apparatus the voltage from lead A (Fig. 2) of cable 17 to neutral is taken as a reference phase, "phase 0," to which all other phases described in the operation of the apparatus are eventually referred, and when reference is made to "one cycle" of the generator output it will mean one cycle of this reference, "phase 0."

One set of polyphase leads from the generator 15 is connected through a cable 17 to the selector switches 11. A branch set of three-phase leads may connect, through cable 17', to a resolver or phase-changer 19. This delivers a single-phase output, of selected phase with respect to the reference "phase 0," to a trigger generator 21. The resolver 19 and trigger generator 21 are auxiliaries not an essential part of the present invention, which may be convenient for certain applications. If used, generator 21 develops from the single-phase output of the resolver 19 unidirectional pulses occurring once per cycle of the input wave. These pulses trigger a conventional sweep generator 23, having a synchronizing input which may be connected to generator 21 through switch 89, to generate sawtooth waves that are supplied to the deflecting means of a cathode-ray oscilloscope tube 25.

For convenience this tube 25 is illustrated as using electrostatic deflection, in which case the wave developed by the sweep generator will be sawtooth with respect to its voltage output. Magnetic deflection could equally well be used for deflecting the cathode-ray beam, in which case the sweep generator 23 would develop a sawtooth current wave. Because, in general, horizontal deflection is used for the sweep, such deflection will be assumed in the description that follows. In this case the indications from a sensing element will be applied to the vertical deflecting means of the oscilloscope.

Figure 2:
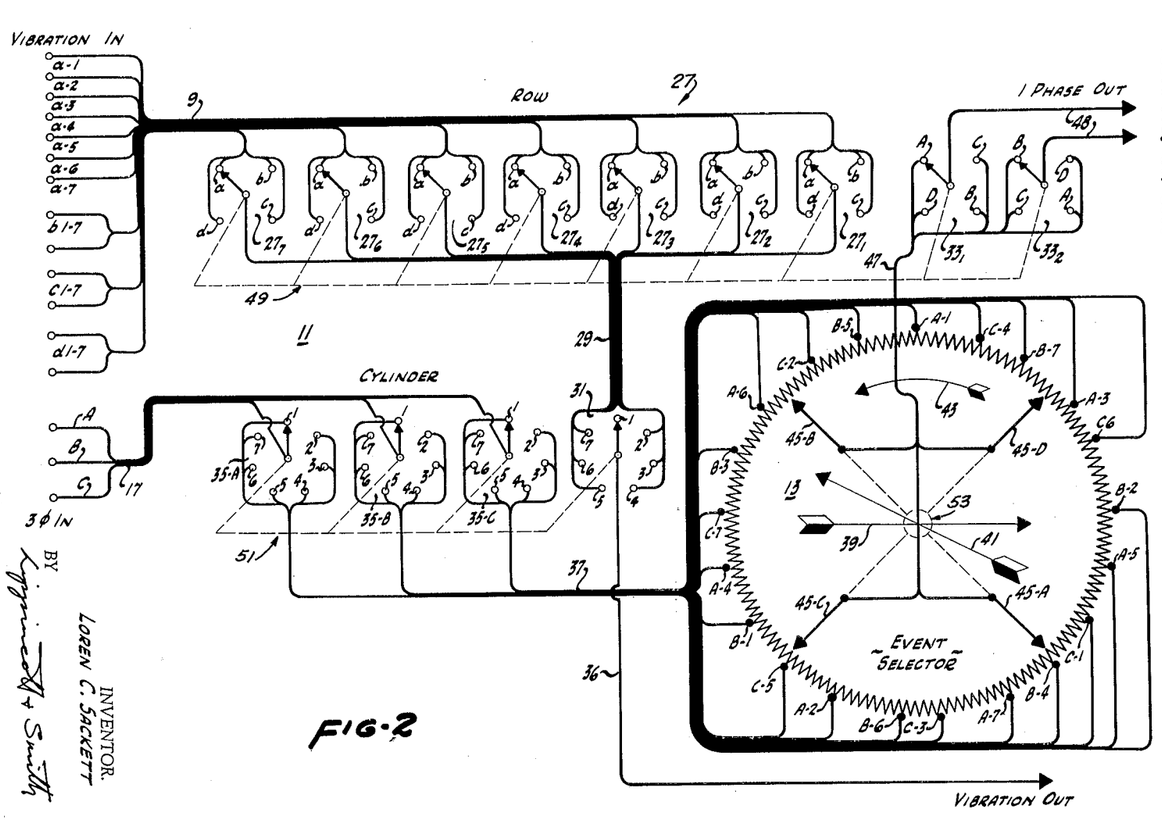
Fig. 2 is a schematic diagram of one form of event-selecting resolver and its associated leads and switches.
Figure 3:
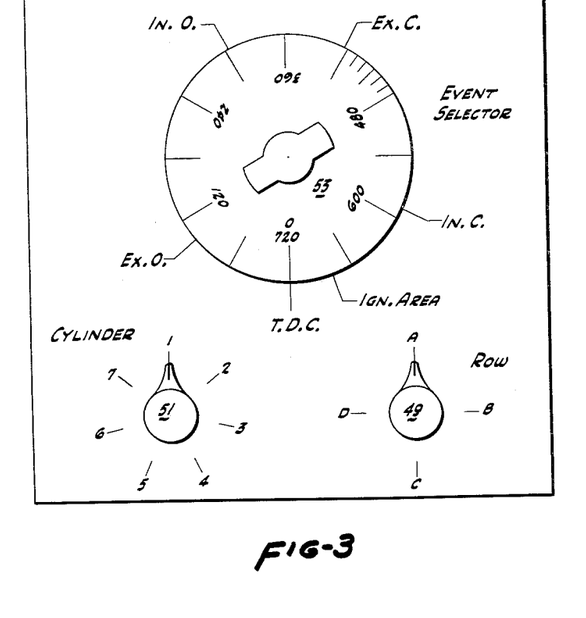
Fig. 3 is a diagrammatic illustration of one form of control panel for the apparatus of Fig. 2.

The arrangements for applying these indications, as well as the pulses from the micro-timer, to the deflecting means will be better understood following the description of the construction and operation of elements 11 and 13, which can best be appreciated by reference to Figs. 2 and 3.

For purposes of illustration it will be assumed that preselector switch 7 is thrown to connect the various leads of cable 9 to the vibration-sensing elements associated with the various cylinders of the engine. In Fig. 2 the seven leads from bank A are shown complete, the leads being designated as $a-1$, $a-2$, etc., to $a-7$. Similar complete sets of leads are of course connected to the sensing elements for each of the other banks; these are symbolized only by two leads each, designated as $b-1-7$, etc.

The leads in the cables of each bank connect to the switch points of a series of seven ganged four-point switches, one deck of the ganged switch being provided for each of the seven cylinders in one bank. These switches are designated by the common reference character 27, with a subscript indicating the number of the cylinder in each bank to which the leads leading to that particular deck of the switch are connected. Thus the switch points of deck $27_1$ connect to cylinder 1, the master cylinder, of each of the four banks, the four points being designated as $a$, $b$, $c$, and $d$, clockwise around the switch to correspond to the designations of the banks. The arrangement connects all contacts from one bank of cylinders simultaneously, to a set of seven output leads, the leads from all of the switch arms being shown as combined into a cable 29 which connects to the points of a seven-point switch 31. Also ganged with switches 27 are two additional four-point switch decks $33_1$ and $33_2$ whose function will be described below.

The contact arm of a switch 31 connects to an output lead 36. It will be seen that by operating switches 27 all of the leads from any one bank are connected to the points of switch 31 and by operating switch 31 the lead from any selected cylinder of the chosen bank is connected to output lead 36 which connects, eventually, to the display oscilloscope.

Switch 31 is mechanically interconnected or ganged to three other switches designated, respectively, as 35–A, 35–B, and 35–C. The arms of these three switches connect, respectively, to the leads A, B and C in cable 17 from generator 15. Each deck of the ganged switches 35 has seven points, which are numbered from 1 to 7 in the diagram to correspond to the seven cylinders in each bank of the engine. The leads from all of the points of the three switch decks are combined in a 21-lead cable 37 which connects to the field element of resolver 13.

The resolver that has been chosen for illustration is of the resistive type, and comprises a continuous ring resistor that forms the stator element of a potentiometer. The leads from the points of switches 35 connect to the potentiometer ring at points distributed around the entire circumference of the ring at slightly nonuniform intervals. The points of connection to the potentiometer ring are indicated on the drawing by reference characters corresponding to the designation of the various switch points on switches 35; thus the connection to point 1 of switch deck 35A is indicated at A–1, that connected to switch point 2 of 35B is designated as B–2, and so on. The connection points A–1, B–1 and C–1 are separated by accurately spaced 120 degree intervals around the circumference of the winding, representing one set of polyphase input connections to the resolver corresponding to cylinder 1 of any one of the banks of the engine. The second set of polyphase input connections, from points 2 of the three switches 35, and designated as A–2, B–2 and C–2 are spaced from the connections to points 1 of the switches by approximately, but not exactly, one-fourteenth of the circumference of the ring plus 180°, as indicated by reference characters A–2, B–2 and C–2. The angular separation between connection A–1 and A–2 is equal to ½ the angle of rotation of the crank-shaft between top dead-center of cylinder 1 and top-dead center of cylinder 2 plus 180°. This spacing is predicated on the fact that the rotating field developed in the ring winding, like generator 15, turns at ½ crank-shaft speed, so that 180° of the winding corresponds to 360° of crank-shaft rotation. The piston of any cylinder is at top dead-center when the vector representing the instantaneous maximum voltage across the ring, points in either of two opposite directions, once on the compression stroke, again on the exhaust stroke. The firing order of the cylinders is 1, 3, 5, 7, 2, 4, 6, 1. When cylinder 1 fires, cylinder 2 is approaching top dead-center, but on the exhaust, not the compression stroke; cylinder 2 will not fire until the crank-shaft has made one complete revolution plus approximately 51.5°. Like-lettered connection points bearing consecutive numbers are therefore separated by one-half this angle of crank-shaft rotation.

In like manner additional sets of polyphase connections are made to points A–3, B–3 and C–3, and so forth, down to A–7, B–7 and C–7, each set of similarly numbered connections being displaced from the previous set by angles equal to ½ the crank-shaft rotation between the top dead-center positions of successive cylinders on their compression strokes. The resultant displacement of the contact points around the resolver ring will be similar to that shown. Their actual angles will differ with engines of different geometrical design and the spacing thus shown is not intended to be accurate, but merely indicative of the general arrangement of the set-up.

It should be evident from the nature of the invention that the resistance ring of the device should be very accurate, the resistances included between any two equally-spaced points on its periphery being as precisely equal as it is possible to make them. In order to accomplish this the element is preferably constructed of a very large number of turns of fine resistance wire and hence this element is referred to hereinafter as a "winding." Theoretically it would be equally possible to construct a ring potentiometer comprising a single turn of highly resistive material, in film, wire or sheet form, although present methods of construction in this manner do not lead to as accurate results as the type using the large number of turns of fine wire. As used herein, therefore, the term "winding," when used to describe the resolver element is intended also to include elements of the single-turn type. The choice of the multiple-turn type is dictated by the greater economy of this type for equal accuracy, using presently available components.

With a potentiometer ring of the type described, supplied by polyphase, equally-separated connections, a single-phase voltage exists between any two separated points around the ring. The maximum such voltage exists between diametrically opposite points on the ring.

Assuming that the three voltages supplied between, for example, connections A-1 and B-1, B-1 and C-1, and C-1 and A-1 are equal, and the supply voltage waves are truly sinusoidal in form, there will always be two diametrically opposite points on the resolver ring between which the maximum peak voltage exists, these points of maximum voltage rotating around the ring at the frequency of the three-phase generator. Accordingly, the device may properly be said to set up a rotating electric field. A pick-up member, rotatable with respect to the ring and having two contacts arranged to engage diametrically opposite points thereon will accordingly pick up a single-phase electrical wave. This wave will vary in phase with respect to "phase 0" of the generator through 360 degrees, or one complete cycle, as the pick-up member is rotated through 360 degrees.

By like reasoning, if the supply to the ring is changed from the A-1, B-1, C-1 connections to the A-2, B-2, C-2 connections, the direction of the rotating fields at the instant of voltage maximum of the reference phase will be shifted in space by the angular separation of the A-1 and A-2 input connections, and for a given position of the pick-up contacts the phase of the electrical voltage wave across them will be shifted by an electrical angle equal to the physical angle between the two sets of polyphase input connections. Thus if, at the instant of peak voltage of the reference phase, the points of maximum voltage across the potentiometer ring are in the direction of the arrow 39 of Fig. 2 when the switch 35 is connected to contacts 1, a shift to contacts 2 will result in the direction of maximum voltage at reference-phase-maximum shifting to the direction of arrow 41. It is a shift of this character that is meant by a shift of the phase of the rotating field "in space."

The order of the connections of phases A, B, and C, from the generator to the resolver ring is indicated in the proper order to make the direction of rotation of the vector, symbolizing voltage maximum, counterclockwise as indicated by the arrow 43. Shifting from contacts 1 to 2 of switch 35 therefore delays the phase of the rotating vector by an amount equal to one-half the angle that the crank-shaft must traverse between top dead-center on the compression stroke of cylinder 1 and top dead-center on the compression stroke of cylinder 2.

The pick-up elements utilized to take off the single-phase current at proper phase are dual in the device illustrated, comprising two pairs of movable contacts, one pair designated as 45-A and 45-B respectively, the other pair as 45-C and 45-D, thus providing two single-phase outputs in phase quadrature, or in effect a two-phase output. These contacts connect through a cable 47 to the contacts on the two decks of switch 33, already described as ganged with switches 27. The switch points on these two decks designated by the letter A connect to movable contacts 45-A and similarly the switch points designated B, C, and D connect to movable contacts 45-B, 45-C and 45-D, respectively. The switch arms of switches 33 connect to a pair of output leads 48, whereby a single-phase output is provided which can be shifted by successive 90-degree phase increments by rotation of switches 33. The elements shown schematically in Fig. 2, comprising the elements designated in Fig. 1 as 11 and 13 respectively, are preferably mounted in a single cabinet provided with controls as illustrated in Fig. 3, which shows one form of panel design. Ganged switches 27 and 33 are provided with an indexed control knob 49, inscribed to indicate cylinder banks A, B, C and D. A similar control knob 51 is provided with indicia indicating the numbers of the cylinders in each bank, from 1 to 7, and connected to switches 31 and 35. The pick-up member of the event-selector or resolver 13 is provided with a scale and indices 53. The scale is provided with suitable graduations to indicate angle of rotation of the crankshaft, preferably in degrees, although other uniform graduations could be used. Since the supply from the three-phase generator 15 is at half crankshaft speed, the angular scale, if degree graduation is used, is graduated to indicate two complete revolutions of the crank-shaft, or from zero to 720 degrees.

The indices of the resolver are arranged to show the epochs of the engine cycle which are important to its operation. One index is provided for the chosen datum or time zero position of the various cylinders. The other indicia indicate the various correct epochs of the engine cycle that are indicated by the sensing elements, as specified by the engine manufacturer. The datum selected in the present instance is top dead-center "T.D.C." of the compression stroke, and the other indices show the proper angles of crank rotation from the datum of the opening of the exhaust valve, "EX O," the opening of the intake valve "IN O," the closing the exhaust valve "EX C," the closing of the intake valve, "IN C," and the general area in which ignition occurs at various speeds of operation, indicated as "IGN. AREA." It of course makes no difference whether the indicia are movable and the scale stationary or vice versa.

The overall result of this arrangement is that when engine and generator are in operation, a single-phase voltage wave exists in leads 48, that has a phase-relation to the reference phase of the generator which depends upon the setting of the switch knobs 49 and 51, and the resolver dial 53. The setting of knob 51 determines the number of the cylinder in any row that has its sensing element connected to output lead 36 and sets the phase in space of the resolver field accordingly. The setting of switch knob 49 selects the row or bank of cylinders in which the selected numbered cylinder is so connected, both as regards the phase of the output current and the sensing element. The parts are so adjusted that the output voltage passes through zero at the epoch of the particular cylinder cycle indicated by the setting of the resolver dial.

Returning to the block diagram of Fig. 1, lead 48, shown as connecting to the selector switches 11, connects to a wave-shaper 55 which converts the sine-wave input into a rectangular wave. A conventional type of such wave-shaper is an overdriven amplifier, that clips the peaks of the sine-wave input. The rectangular waves next pass to a differentiating network 57, which may be either a small series condenser, supplying a resistor bridged across the output line, the time constant of the resistor condenser combination being so selected as to be very short in comparison with the period of the input wave, or an inductor bridged across the line. Since these arrangements are quite conventional they are not shown in schematic diagram. The pulses developed by the differentiating network are of opposite sign for successive crossings of the zero axis by the input wave. If desired, pulses of one sign only can be selected by a rectifier 59, following the differentiating network.

Lead 36, carrying the indication from the selected sensing elements, connects from the selector switches 11 to an amplifier 61, designated as the "vertical amplifier." In a preferred form of the apparatus the output from amplifier 61 is supplied through lead 63 to a summing or adding circuit 65. The summing circuit usually takes the form of an amplifier, the output of which, at any instant, represents the algebraic sum of the amplitudes of the input signals. The resultant output signal is applied to the vertical deflection system of tube 25 as is indicated in the diagram. Summing networks of various kinds are also conventional and therefore that used is not shown in detail.

In an alternative system of display, switch 67 in the output lead from differentiating network 57 and rectifier 59, if the latter is used, can be connected to the grid of the display tube screen through lead 69, in which case the pulse delivered by the equipment will either intensify or blank out the trace on the screen of the tube.

Preferably the same apparatus as that used to develop the cursor also serves to trigger the sweep circuit initiating the time-base at a definite epoch of operation of the selected cylinder that is accurately measurable on the event-selector scale in the same manner as is the position of the cursor pip. A branch lead 85 connects to the output of differentiating network 57, and is shown as connecting to a rectifier 87, so poled as to select the pulse of opposite sign from that used to create the cursor pip. Like rectifier 59, rectifier 87 is often unnecessary, since sweep generators frequently respond to pulses of one sign only, positive or negative as the case may be. Whether or not the rectifier is used the triggering pulse, 180° electrically out of phase with the cursor pulse, is supplied through switch 89 to synchronize the sweep generator.

It should be evident that the ability to set the time-base zero at an accurately-measurable phase of the cycle of any selected cylinder is of itself a very valuable feature of the invention, even for analyses where the cursor is not necessary or desired.

There can be occasions, however, when it may be desirable to adjust the initial point of the sweep independently of the position of the cursor. It is only in cases where such occasions are contemplated that an alternative triggering equipment is supplied comprising the auxiliary resolver 19, supplied with three-phase current from the generator through branch leads 17'. Resolver 19 may comprise a ring potentiometer similar to that already described in connection with the event-selector resolver 13, except that it has but three input connections, spaced 120 degrees apart around its periphery, and a single pair of contacts upon its pick-up member. With this arrangement the single-phase output delivered to trigger generator 21 can be changed in its relation to the reference phase, as has already been described in connection with the event-selector. The single-phase output is supplied to trigger generator 21, which may contain elements identical with those already described in connection with elements 55, 57, and 59, the combination delivering a pulse output to sweep generator 23 when switch 89 is thrown to the position opposite to that shown. Trigger pulses as thus described initiate the sweep generator fly-back. The manner of triggering the sweep, and the sweep generator itself, are conventional and therefore are not described in detail. The sweep generator is indicated as being provided with a gain control 71, this also being conventional practice, so that the amplitude of the sweep may be varied as desired, either to limit it, so that traces indicating the entire cycle of operation of the engine are displayed, or to expand it so that the portion displayed on the screen is only a small portion of the cycle. By adjustment of resolver 19, the timing of the sweep can be so adjusted as to bring a particular event (such, for example, as the instant of closing the exhaust valve) to the center of the screen, where it is most readily available for scrutiny.

Figure 4:
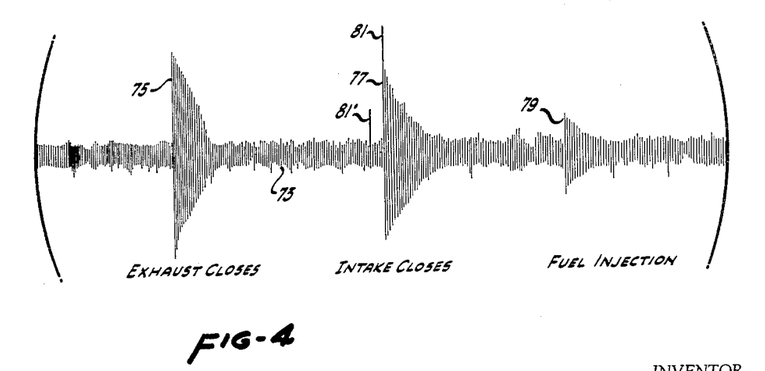
Fig. 4 is an illustration of a characteristic trace on an oscilloscope screen of the indications provided by vibration sensing elements associated with one cylinder, showing the appearance of the cursor or pip developed by the micro-timer of this invention as it appears on the trace.

The general appearance of the portion of the display screen on which the trace of a vibration-sensing element is displayed is indicated on Fig. 4, in negative, of course, since the cathode-ray tube type of display indicates a bright trace on a dark background. The vibration-sensitive means, although so mounted that they respond primarily to valve operations, are so sensitive that they pick up constant background vibrations or "noise," as is indicated by the irregular band of roughly constant width extending across the face of the screen and indicated by reference character 73. Perturbations indicating the events under study are superposed on this band, as indicated at 75, indicating the closing of the exhaust valve. This is followed, some time later, by the closing of the intake valve, as shown at reference character 77, and still later by the fuel injection shown at 79. In each case the event under study is indicated by the sharp front or leading edge of the roughly triangular vibration traces, and is followed by a damped vibration, dying out slowly as the drawing shows.

If it is the closing of the intake valve that is under study, the zero of dial 53 may be set to the index "IN C," which should show the pulse as a pip or cursor superposed on the leading edge of the corresponding trace at 77, as indicated by the spike or pip 81. If, however, the intake valve is closing a few degrees later than the epoch of the cycle specified by the engine manufacturer as the norm, the pip will appear at a point indicated by 81'. Rotating the dial 53 shifts the position of the pip; this operation is performed manually by the analyst, the indication running along the trace until it is brought into position 81. The error in angle is then read directly in degrees on the dial against the "intake closing" index.

It will be seen that this angle measurement is quite independent of the amplitude of the sweep or the position on the display screen of the event under study. The pip can be run along the trace as a cursor to any position desired, for example, into coincidence with the leading edge of the vibration shown at 75, and its position with respect to the proper epoch read directly against the "Exhaust Closes" index. By increasing the amplitude of the horizontal sweep the distance between the point of occurrence of the pip at point 81' and the dying out of the vibration shown at 77 can be expanded to fill the entire face of the tube and hence the position of the pip can be observed with great accuracy. In actually checking an engine it is, of course, unnecessary to first set zero on the dial 53 under the desired index; actually the pip is usually run along the trace until it coincides with the leading edge of the perturbation indicating the event to be observed and the error, if any, read directly in degrees. Another method of use is to set the cursor on the leading edge of a trace and read its angle from the "T.D.C." index. In this manner the epoch of any abnormal vibration occurring within the engine can be determined and its probable cause diagnosed. In referring to the cursor being "run along" the trace it will be understood that relative movement is what is referred to. If both the sweep-triggering pulse and the cursor-pulse are derived from the event-selector the position of the pip will remain substantially fixed in the center of the display screen and turning the dial will cause the trace to appear to move beneath it. If, however, the switch 89 is set to trigger the sweep from the auxiliary source, it will be the trace that appears stationary while the cursor moves. In either case the epoch of the cylinder cycle indicated by the cursor is read directly from the scale, with an accuracy that depends solely on the precision with which the apparatus is constructed and that can be made within ±½° of crank rotation or even better.

It is from this direct reading feature of the apparatus that all of its various other advantages stem, and this depends, in turn, first, upon the ability to develop the cursor pulse at any epoch whatsoever of the cycle of operation of the engine; second, upon the ability to establish the phase of the cycle of operation at which the pulse is generated (i.e., "time zero") with respect to any individual cylinder, so that a given angle indicated on the time scale means the same thing whatever cylinder may be under examination; and third, upon so interconnecting the device that the "time zero" is always related to the cylinder with which the sensing element developing the indications being studied is associated.

It will be apparent to those skilled in the art that there are various combinations of switching and resolver mechanisms by which these factors can be achieved. The use of inductive instead of resistive means for setting up the rotating field has already been referred to. Connections can be made to a ring-wound inductive resolver in the same manner as to a resistive one, although slightly less conveniently. The change of phase, in space, of the rotating electric field can be achieved by rotating the field-establishing member itself, instead of by feeding it at different points distributed around the winding, and the amount of rotation to the specific angles required can be determined by a properly-designed index plate. It is obvious that the switching to the various sensing elements can be coordinated with the motion of an index plate as well as with the motion of a switch. All of these expendients are, however, relatively clumsy, as compared to the apparatus shown, which is, accordingly, that preferred.

The specific apparatus shown and described is therefore not intended as limiting the scope of the invention, intended limitations being specifically set forth in the claims that follow:

1. A micro-timer for use in combination with an engine analyzer for multi-cylinder engines comprising individual means for sensing events occurring in each cylinder of said engine in each cycle of operation thereof, a source of polyphase current synchronized with the cycle of operation of said engine and curve-tracing means for displaying indications from said sensing elements on a time-base synchronized with said cycle, said micro-timer comprising the elements designated as elements (a) to (f) and defined as follows:

Element (a): a resolver comprising a polyphase field member for developing a rotating field and a pick-up member for deriving from said field a single-phase electric wave, said members being relatively rotatable to vary the phase of said single phase wave with respect to a selected reference phase of a polyphase supply to said field members;

Element (b): an angularly divided scale and an index therefor, said scale and index being relatively movable and one thereof being mechanically connected with said field member and the other thereof connected with said pick-up member so as to indicate on said scale angles of relative displacement between the members of element (a);

Element (c): means for changing the angular relation of said reference phase as supplied to said field member of element (a) with respect to the scale and index of element (b) by successive definite angular increments proportional to the increments of crankshaft rotation of the engine to be tested between like datum epochs in the cycles of operation of the various cylinders thereof;

Element (d): switching means interconnected mechanically with element (c) for connecting a selected one of said sensing elements corresponding to the angular relationship established by element (c);

Element (e): means for developing from a single phase electric wave derived by element (a) sharp pulses occurring at fixed epochs of each cycle of said single-phase wave; and Element (f): terminals for connecting elements (d) and (e) concurrently to said curve tracing means.

2. A micro-timer for use in combination with an engine analyzer for multi-cylinder engines comprising individual means for sensing events occurring in each cylinder of said engine in each cycle of operation thereof, a source of polyphase current synchronized with the cycle of operation of said engine and curve-tracing means for displaying indications from said sensing elements on a time-base synchronized with said cycle, said micro-timer comprising the elements designated as elements (a) to (f) and defined as follows:

Element (a): a resolver comprising a polyphase field member for developing a rotating field and a pick-up member for deriving from said field a single-phase electric wave, said members being relatively rotatable to vary the phase of said single-phase wave with respect to a reference phase;

Element (b): an angularly divided scale and an index therefor, said scale and index being relatively movable and one thereof being fixed in position and the other attached to the movable member of element (a);

Element (c): means including leads adapted for connection to said source of polyphase electric current, for establishing said rotating field in the field member of element (a) and for selectively changing the phase of said rotating field in space with respect to the phase of the current from said alternating source by definite increments of electrical angle proportional to the increments of angular position of said crankshaft corresponding to like datum points in the cycles of operation of successive cylinders of said engine;

Element (d): switching means mechanically interconnected with the phase changing means of element (c) for selectively connecting to the means for sensing events in a cylinder corresponding to the phase selected by said element (c);

Element (e): means for developing from the single phase wave derived by element (a) short pulses of electrical energy occurring at a definite phase of said wave; and Element (f): terminals connected to elements (d) and (e) adapted to supply indications therefrom simultaneously to said curve drawing means.

3. A micro-timer as defined in claim 1 wherein the field member of element (a) comprises a continuous ring winding and element (c) comprises a plurality of sets of polyphase connections thereto, the connections of each set being to equally spaced positions around said ring winding and the connections of successive sets being spaced proportionally to the angular spacing of positions of said crankshaft with respect to like datum points in the operation of successive cylinders, and switching means for connecting any selected one of said sets to said source of polyphase electric current.

4. A micro-timer as defined in claim 2 wherein said ring winding comprises a continuous resistor.

5. A micro-timer as defined in claim 1 including, in addition, a summing network for combining indications from element (d) and pulses from element (e).

6. A micro-timer as defined in claim 1 comprising, in addition, means for varying the phase at which said curve-tracing means is synchronized with the cycle of operation of said engine, thereby to center any desired indication on the trace described thereby.

7. Apparatus for use in combination with an engine analyzer for indicating the performance of multi-cylinder engines and including individual sensing elements associated with each of the cylinders of such engine for indicating the occurence of events in the operation of the respective cylinders, a source of polyphase electric current driven synchronously with said engine and having a period equal to one complete cycle of operation of said engine and means for displaying the indications of said sensing elements as a trace on an oscilloscope, said apparatus comprising the combination of elements designated as elements (a) to (g) inclusive and defined as follows:

Elements (a): a ring-connected potentiometer having movable contacts connecting to diametrically opposite positions on the ring thereof;

Element (b): a plurality of sets of polyphase connections to said ring, the connections comprising each of said sets to said ring being equally spaced therearound, the number of said sets being equal to the number of cylinders in a bank firing at substantially uniform intervals throughout one cycle of operation of the engine to be tested, and the angular spacing between corresponding connections of the respective sets to said ring being proportional to the spacing of corresponding datum points in the operation of the respective cylinders within said cycle of operation;

Element (c): switching means for selectively connecting any one of said sets of polyphase connections to said source of polyphase energy;

Element (d): means connected to the movable contacts of element (a) for developing from electric waves picked up thereby sharp pulses of electrical energy occurring at specific phases of said waves;

Element (e): indexing means mechanically connected to the movable contacts of elements (a) for indicating the position thereof with respect to said ring;

Element (f): switching means mechanically connected to element (c) for selectively connecting to one of said sensing elements corresponding to the set of polyphase connections selected by element (c); and Element (g): output terminals for connecting elements (d) and (f) to the control elements of an oscilloscope.

8. Apparatus for use in combination with an engine analyzer for indicating the performance of multi-cylinder engines and including individual sensing elements associated with each of the cylinders of such engine for indicating the occurrence of events in the operation of the respective cylinders, a source of polyphase electric current driven synchronously with said engine and having a period equal to one complete cycle of operation of said engine and means for displaying the indications of said sensing elements as a trace on an oscilloscope, said apparatus comprising the combination of elements designated as elements (a) to (h) inclusive and defined as follows:

Element (a): a ring-connected potentiometer having movable contacts connecting to diametrically opposite positions on the ring thereof;

Element (b): a plurality of sets of polyphase connections to said ring, the connections comprising each of said sets to said ring being equally spaced therearound, the number of said sets being equal to the number of cylinders in a bank firing at substantially uniform intervals throughout one cycle of operation of the engine to be tested, and the angular spacing between corresponding connections of the respective sets to said ring being proportional to the spacing of corresponding datum points in the operation of the respective cylinders within said cycle of operation;

Element (c): switching means for selectively connecting any one of said sets of polyphase connections to said source of polyphase energy;

Element (d): means connected to the movable contacts of element (a) for developing from electric waves picked up thereby sharp pulses of electrical energy occurring at specific phases of said waves;

Element (e): indexing means mechanically connected to the movable contacts of element (a) for indicating the position thereof with respect to said ring;

Element (f): switching means mechanically connected to element (c) for selectively connecting to one of said sensing elements corresponding to the set of polyphase connections selected by element (c);

Element (g): summing means for adding algebraically the instantaneous values of indications from elements (d) and (f); and Element (h): output terminals for connecting element (g) to the deflecting elements of an oscilloscope.

9. In an analyzer for monitoring the performance of multicylinder engines, having individual sensing means associated with each cylinder of said engine for providing electrical indications of engine performance and a source of polyphase electric current driven synchronously by said engine, the combination comprising the elements designated as elements (a) to (g) and defined as follows:

Element (a): an event selector comprising a continuous ring potentiometer including movable contactors engaging diametrically opposite points on said ring and indexing means for indicating the position of said contacts;

Element (b): a plurality of sets of polyphase connections to said potentiometer corresponding in number to the number of cylinders in a group all members whereof fire during one cycle of said polyphase source at nearly but not exactly equal phase angles thereto, the points of connection of each of said sets being distributed around said ring at angles corresponding to the relative angular firing of said cylinders;

Element (c): switching means for connecting any selected one of said sets of polyphase connections to said source;

Element (d): switching means mechanically interconnected with element (c) for making connection with a sensing means associated with a corresponding cylinder;

Element (e): means connected to the movable contactors of element (a) for developing from a substantially sinusoidal wave delivered thereby sharp pulses occurring at specific phase-angles thereof;

Element (f): means for adding pulses developed by element (e) to indications from the sensing means selected by element (d); and Element (g): means connected to element (f) for displaying the time relation between said pulses and said indications, whereby the movable contacts of element (a) can be adjusted to bring said pulses and indications into time coincidence and the timing of said indications in the operating cycle of the engine can be read from the indexing means of element (a).

10. Apparatus for use in combination with an engine-analyzer for multi-cylinder engines, including individual sensing elements associated with each cylinder of such engine for detecting events occurring in the operation of such cylinder, a curve-tracing device for displaying indications from said sensing elements, and a source of polyphase electrical current operative synchronously with said engine and having a period equal to one cycle of operation of said engine, means for determining the epochs of the cycle of operation of each cylinder at which the indicated events occur comprising the combination of elements designated as elements (a) to (g) inclusive and defined as follows:

Element (a): a relatively movable scale and index members graduated in terms of crankshaft rotation throughout one cycle of operation of an engine to be tested, with respect to a selected datum point within said cycle;

Element (b): a polyphase resolver comprising a field member for establishing a rotating field and a relatively movable pick-up member for deriving from said field a single-phase electrical wave of variable phase with respect to a reference phase of said rotating field, each of said members being connected to one of the members of element (a);

Element (c): connections for supplying polyphase electric current to the field member of element (b);

Element (d): means for changing the angular relationship between the reference phase of said rotating field and the datum of said scale by fixed increments proportional to the angular displacement of the crankshaft of the engine to be tested between the datum points in the operation of successive cylinders of said engine;

Element (e): switching means mechanically connected with element (d) for connecting the sensing means associated with a corresponding cylinder to operate the curve-tracing means of the anaylzer;

Element (f): means for developing from the single-phase wave derived from the pick-up member of element (b) instantaneous pulses coinciding with a specific phase thereof; and Element (g): terminals for applying the pulses developed by element (f) to produce indications on said curve-tracing means.

11. The combination as defined in claim 10, including in addition, summing circuit connected to elements (e) and (f) of claim 10 for producing electrical indications proportional to the algebraic sum of the instantaneous values of the indications of said sensing elements and said pulses.

12. Indexing apparatus for use in combination with an engine-analyzer for multi-cylinder engines wherein indications of events occurring in the operation thereof are displayed on the screen of an oscilloscope, means for accurately measuring the phase relation of the events so indicated to a datum phase in the operation of the cylinder wherein such events occur, which comprise the combination with individual elements for sensing such events associated respectively with each cylinder and a source of polyphase electric energy driven synchronously with said engine and having a period equal to that of one complete cycle of operation of said engine, of the elements designated as elements (a) to (f) inclusive and defined as follows:

Element (a): switching means for selectively connecting to an individual one of said sensing means;

Element (b): a resolver adapted for connection to said polyphase source of electric current and comprising means for developing a rotating field and means movable with respect to said field-developing means for deriving therefrom a single-phase electric wave of controllable phase with respect thereto;

Element (c): means mechanically interconnected to element (a) for so varying the phase in space of said rotating field that at the instant of occurrence of a datum event in the operation of any cylinder the sensing element whereof is connected to element (a) the instantaneous direction of said rotating field is the same;

Element (d): a scale mechanically connected to the movable means of element (b) graduated to read the phase-angle of the single-phase electric wave developed thereby with respect to the direction of said rotating field at the instant of said datum event;

Element (e): means for developing from said single-phase electric wave pulses occurring at a fixed phase with respect thereto; and Element (f): terminals for connecting elements (a) and (e) to control electrodes of the oscilloscope of said engine-analyzer.

13. Apparatus for use in combination with an engine-analyzer for multi-cylinder engines, including individual sensing elements associated with each cylinder of such engine for detecting events occurring in the operation of such cylinder, a curve-tracing device for displaying indications from said sensing elements, and a source of polyphase electrical current operative synchronously with said engine and having a period equal to one cycle of operation of said engine, means for determining the epochs of the cycle of operation of each cylinder at which the indicated events occur comprising the combination of elements designated as element (a) to (f) inclusive and defined as follows:

Element (a): a polyphase resolver comprising a field member for producing a rotating field and a relatively movable pick-up member for developing a single-phase electrical wave from said rotating field variable in phase with respect to a reference phase of said field;

Element (b): a relatively movable scale and index, each connected to one of the members of element (a), said scale being graduated to indicate the rotation of the crankshaft of an engine under test with respect to a datum point in the cycle of operation of a cylinder of such engine;

Element (c): a plurality of sets of polyphase connections to the field member of element (a), the connections of each set being equally spaced around said field member, and the connections of each successive set being displaced angularly from those of the preceding set proportionally to the angular displacement of the crankshaft of said engine between the datum points in the operation of the successive cylinders;

Element (d): switching means for simultaneously and selectively connecting the source of polyphase current of said analyzer with one set of the connections of element (c) and the sensing element associated with a corresponding cylinder of the engine to the curve tracing device of the analyzer;

Element (e): means for developing from the electrical wave derived by the pick-up member of element (a) sharp electrical pulses coinciding in time with a selected phase of said wave; and Element (f): terminals for applying pulses developed by element (e) to the curve-tracing device of said analyzer.

14. Apparatus for analyzing the operation of cyclically operating machinery in terms of a phase-angle with respect to a selected datum-point in the cycle of operation thereof, which comprises the combination with means for sensing critical events in said cycle and developing in response thereto electrical impulses indicative of such events and curve-tracing means responsive to said electrical impulses for indicating the same as perturbations of the curve traced thereby, of the elements designated as elements (a) to (g) and defined as follows:

Element (a): means for developing a polyphase electrical wave, adapted to be driven by the machine under analysis to generate one cycle per phase in each cycle of operation of said machine;

Element (b): a polyphase resolver connected to element (a) and comprising a field member developing a field rotating in space synchronously with the operation of element (a) and a pick-up member for deriving from said field a single-phase electrical wave said elements being relatively rotatable to vary the phase of said single-phase wave with respect to a selected reference phase of said polyphase wave;

Element (c): a relatively movable scale and index, one whereof is attached to one of the members of element (b) and the other attached to the other of said members, said scale being graduated to read in terms of phase with respect to a zero datum;

Element (d): means connected to the pick-up member of element (b) for developing from the single-phase wave derived thereby short electrical pulses occurring at a fixed phase of said single-phase wave;

Element (e): means for setting the phase-angle of the reference phase of said rotating field with respect to element (c) to cause the index thereof to read zero on said scale when pulses developed by element (d) occur at said selected datum-point in the operation of the machine under analysis;

Element (f): means for adding the pulses developed by element (d) to the impulses of said sensing means to form a combined signal; and Element (g): connections for applying said combined signal to said curve tracing means to cause perturbations of the curve traced thereby.

15. Apparatus as defined in claim 14 including means for applying pulses developed by element (d) as defined therein to synchronize the traces traced by said curve tracing device with the cycle of operation of the device under study.

16. Apparatus for analyzing the operation of a cyclically operating machine, comprising a sensing element providing electric signals synchronous with cyclic events in said operation, an alternating-current generator mechanically connected to said machine, adjustable electric phase-shifting means electrically connected to said generator, and an electric marker pulse generator electrically connected to said phase-shifting means for providing repetitive electric marker pulses synchronized with the operating cycle of said machine and occurring at a variable epoch in said cycle controlled by the adjustment of said phase-shifting means, display means for showing the presence of time relation coincidence between said signals and said marker pulses whereby said phase-shifting means can be adjusted to bring said marker pulses into time coincidence with any selected event in the operating cycle of said machine, and an index and scale connecting the said phase-shifting means and calibrated to indicate the phase angle in the operating cycle of said machine at which said marker pulses occurs.

17. Apparatus for analyzing the operation of a multi-cylinder, reciprocating-piston machine having a rotating shaft, comprising a plurality of sensing elements, one for each of said cylinders for providing electric signals synchronous with cyclic events therein, a polyphase alternating-current generator connected to be driven by said shaft, adjustable electric phase-shifting means having input and output parts that are rotative relative to each other for adjusting the amount of phase shift produced by such phase-shifting means, said input part being electrically connected to said generator, an electric pulse generator connected to output part for repetitively providing electric pulses at an angular position of said shaft that can be varied by adjustment of said phase-shifting means, an index and scale connected to said input and output parts for indicating the adjustment thereof, said index and scale being calibrated to display the epochs of an operating cycle at which said pulses are generated, an oscilloscope connected to display the time relation between said pulses and the signals provided by one of said sensing elements, switching means for connecting each of said sensing elements selectively to said oscilloscope, and other switching means for varying the relation between the angular position of said shaft and the generation of said pulses by fixed increments proportional to the angular rotation of said shaft between corresponding epochs in the operating cycles of successive cylinders, said two switching means being ganged to be operated together so that the indications of said scale automatically correspond to epochs in the operating cycle of the cylinder associated with the selected sensing element.

References Cited in the file of this patent

UNITED STATES PATENTS

| | | |
|---|---|---|
| 2,082,030 | Schrader et al. | June 1, 1937 |
| 2,355,363 | Christaldi | Aug. 8, 1944 |
| 2,518,427 | Lindberg et al. | Aug. 8, 1950 |
| 2,688,126 | Weller | Aug. 31, 1954 |
| 2,688,127 | Sargeant et al. | Aug. 31, 1954 |

FOREIGN PATENTS

| | | |
|---|---|---|
| 156,352 | Australia | May 5, 1954 |